Patented Apr. 19, 1927.

1,625,483

UNITED STATES PATENT OFFICE.

ALFRED CARL MARWIN, OF CHICAGO, ILLINOIS, ASSIGNOR TO WESTERN ELECTRIC COMPANY, INCORPORATED, OF NEW YORK, N. Y., A CORPORATION OF NEW YORK.

CASEIN GLUE.

No Drawing.   Application filed June 24, 1922. Serial No. 570,731.

This invention relates to the production of casein solution or casein glue suitable for cementing together wooden or other surfaces, and its object is to provide such a glue containing ingredients of such character and so proportioned that where it comes into contact with tools operating on articles cemented therewith, the glue will occasion minimum wear thereon, whereby a longer life of the tools is obtained.

A further object of the invention is to produce such a glue, which is waterproof, smooth, easy to apply, and which has sufficiently slow setting properties as to render it usable, after mixing, during an average working day.

In the production of casein glues it has been the practice to include a relatively large amount of alkaline earth hydroxide such as hydrated lime to make the glue insoluble. Where the cemented work is subjected to the cutting action of tools, glue having a large alkaline earth hydroxide content causes considerable wear on the tools, thereby lessening the effective working life thereof. For these reasons in the compound of the present invention only about 10 per cent of alkaline earth hydroxide such as hydrated lime is combined with 75 per cent of casein. With the proportions of casein and lime above specified about 7 per cent of caustic alkali, such as caustic soda, and about 8 per cent of a water soluble alkaline salt, of an alkali, such as trisodium phosphate, are added. About 20 parts by weight of water are added to about 10 parts by weight of the above mixture, the resulting fluid mass being the finished glue. The percentage composition of the finished product is therefore approximately casein 25%; alkaline earth hydroxide 3⅓%; caustic alkali 2⅓%; water soluble alkaline salt of an alkali 2⅔% and water 66⅔%.

In place of hydrated lime other alkaline earth hydroxides such as barium hydroxide, strontium hydroxide and magnesium hydroxide may be used, and in place of caustic soda other caustic alkali such as caustic potash and ammonium hydroxide may be employed. Other alkaline salts may be substituted for the trisodium phosphate such as triammonium phosphate, tripotassium phosphate, disodium phosphate, diammonium phosphate, dipotassium phosphate, sodium carbonate, borax, sodium silicate, potassium carbonate and potassium silicate.

The hydrated lime reacts with the casein and with the trisodium phosphate to render the mixture waterproof. The trisodium phosphate and the caustic soda are both solvents for the casein and therefore retard the setting action of the lime so as to give the mixture a long working life. The caustic soda renders the compound smooth and easy to apply.

As above stated, the small amount of lime included renders the mixture less harmful to tools than any other glues heretofore produced, while the caustic soda and trisodium phosphate in the proportions specified give the compound a smooth consistency and render it workable, after mixing, for a period of at least eight hours under ordinary conditions.

What is claimed is:

1. A casein glue composition consisting of about 25% casein, alkaline earth hydroxide about 3⅓%, alkali and water soluble alkaline salt of an alkali 5%, and water.

2. A casein glue composition consisting of about 25 per cent casein, alkaline earth hydroxide about 3⅓ per cent, caustic alkali about 2⅓ per cent, water soluble alkaline salt of an alkali about 2⅔ per cent, and water.

3. A casein glue composition consisting of casein, hydrated lime, caustic soda, trisodium phosphate and water, the casein and hydrated lime being present in the composition in the ratio of about 7.5 parts to 1 part, respectively.

4. A casein glue composition consisting of about 25 per cent casein, hydrated lime about 3⅓ per cent, caustic soda about 2⅓ per cent, trisodium phosphate about 2⅔ per cent, and water.

In witness whereof, I hereunto subscribe my name this 16th day of June A. D., 1922.

ALFRED CARL MARWIN.